United States Patent [19]
Demers et al.

[11] Patent Number: 5,671,407
[45] Date of Patent: Sep. 23, 1997

[54] APPLICATION-SPECIFIC CONFLICT DETECTION FOR WEAKLY CONSISTENT REPLICATED DATABASES

[75] Inventors: Alan J. Demers, Boulder Creek; Karin Petersen, Menlo Park; Michael J. Spreitzer, Tracy; Douglas B. Terry, San Carlos; Marvin M. Theimer; Brent B. Welch, both of Mountain View, all of Calif.

[73] Assignee: Xerox Corporation, Stamford, Conn.

[21] Appl. No.: 351,841

[22] Filed: Dec. 7, 1994

[51] Int. Cl.$^6$ .............. G06F 17/30; G06F 7/20
[52] U.S. Cl. .............. 395/608; 395/610; 395/617; 395/620; 395/200.03; 395/827; 395/840; 395/182.09; 395/182.1
[58] Field of Search .............. 395/600, 200.03, 395/200.12, 827, 840, 608, 610, 617, 620, 182.09, 182.1

[56] References Cited

U.S. PATENT DOCUMENTS

| | | | |
|---|---|---|---|
| 5,255,387 | 10/1993 | Arnold | 395/600 |
| 5,280,612 | 1/1994 | Lorie et al. | 395/600 |
| 5,287,496 | 2/1994 | Chen et al. | 395/600 |
| 5,551,027 | 8/1996 | Choy et al. | 395/617 |
| 5,577,240 | 11/1996 | Demers et al. | 395/608 |
| 5,581,753 | 12/1996 | Terry et al. | 395/617 |
| 5,581,754 | 12/1996 | Terry et al. | 395/608 |
| 5,588,147 | 12/1996 | Neeman et al. | 395/601 |
| 5,603,026 | 2/1997 | Demers et al. | 395/608 |

OTHER PUBLICATIONS

European Search Report from corresponding EP Application No. 95308824.2.

Brachman, B. et al. Weakly Consistent Transactions In Ross. Proc. of Cascon '93, Toronto, Ont., Canada, 24–28 Oct. 1993, vol. 2., pp. 888–894.

Kistler, J.J. et al. Disconnected Operation In The Coda File System. Proc. of the Symposium on Operating Systems Principles, USA, Oct. 13–16, 1991 ACM, pp. 213–225.

Cellary, W. Forward Oriented Certification In Concurrency Control. Computer and Information Sciences–3. Proc. of ISCIS III. The 3rd International Symposium on Computer and Information Sciences, CESME, Turkey, 29 Oct.–2 Nov. 1988, Commack, NY, USA, Nova Sci. Publishers, USA, pp. 291–298.

*Primary Examiner*—Thomas G. Black
*Assistant Examiner*—Jean Raymond Homere

[57] ABSTRACT

Write operations for weakly consistent replicated database systems have application-specific embedded dependency queries and related descriptions of the results that are expected to be returned when the respective dependency queries are run against the database. The dependency queries are arbitrary queries that are provided by the application to satisfy the requirements of the application. Write operations that conflict with the current state of any given instance of such a database are detected by comparing (a) the results that are returned when the dependency queries for those writes are run against the given instance of the database with (b) the results that are expected to be returned.

1 Claim, 11 Drawing Sheets

| Server S1: | | | Server S2: | | | Server Sn: | | |
|---|---|---|---|---|---|---|---|---|
| 1. | W0 | *W1* | 1. | W0 | | 1. | W0 | |
| 2. | W0 | *W1* | 2. | W0 | *W2* | 2. | W0 | |
| 3. | W0 | *W1* | 3. | W0 | *W2* | 3. | W0 | *W2* |
| 4. | W0 | *W1* | 4. | W0 | *W2* | 4. | W0 | W2 |
| 5. | W0 | *W1* | 5. | W0 | *W2* | 5. | W0 | W2 *W1* |
| 6. | W0 | *W1* | 6. | W0 | *W2* | 6. | W0 | W2 W1 |
| 7. | W0 | *W1* | 7. | W0 | *W1* *W2* | 7. | W0 | W2 W1 |
| 8. | W0 | *W1* W2 | 8. | W0 | *W1* *W2* | 8. | W0 | W2 W1 |
| 9. | W0 | *W1* W2 | 9. | W0 | W2 *W1* | 9. | W0 | W2 W1 |
| 10. | W0 | *W1* W2 | 10. | W0 | W2 W1 | 10. | W0 | W2 W1 |
| 11. | W0 | W2 *W1* | 11. | W0 | W2 W1 | 11. | W0 | W2 W1 |
| 12. | W0 | W2 W1 | 12. | W0 | W2 W1 | 12. | W0 | W2 W1 |

*FIG. 14*

APPLICATION-SPECIFIC CONFLICT DETECTION FOR WEAKLY CONSISTENT REPLICATED DATABASES

FIELD OF THE INVENTION

This invention relates to replicated, weakly consistent data storage systems and, more particularly, to a technique for identifying and detecting application specific conflicts in the proposed updates to such systems.

CROSS-REFERENCES

Related, commonly assigned patent application have been concurrently filed by (1) Demers et al., under Ser. No. 08/352,014 now U.S. Pat. No. 5,603,026 on "Application-Specific Conflict Resolution for Weakly Consistent Replicated Databases"; (2) Demers et al., under Ser. No. 08/352,013 now U.S. Pat. No. 5,577,240 on "Identification of Stable Writes in Weakly Consistent Replicated Databases While Providing Access to All Writes in Such Databases" ; and (3) Terry et al., under Ser. No. 08/352,012 now U.S. Pat. No. 5,581,754 on "Methodology for Managing Weakly Consistent Replicated Databases". Furthermore, still another related application was filed by Terry et al. on Sep. 28, 1994 under Ser. No. 08/314,971 on a "Method for Providing Session Consistency Guarantees", now U.S. Pat. No. 5,581,753.

BACKGROUND OF THE INVENTION

Replicated, weakly consistent databases are well suited for applications involving the sharing of data among multiple users with low speed or intermittent communication links. As an example, these applications can run in a mobile computing environment that includes portable machines with less than ideal network connectivity. A user's computer may have a wireless communication device, such as a cell modem or packet radio transceiver relying on a network infrastructure that may suffer from not being universally available and/or from being very expensive. Such a computer may use short-range line-of-sight communication, such as the infrared "beaming" ports available on some commercial personal digital assistants (PDAs). Alternatively, the computer may have a conventional modem requiring it to be physically connected to a phone line when sending and receiving data, or it may only be able to communicate with the rest of the system when inserted in a docking station. Indeed, the computer's only communication device may be a diskette that is transported between machines by humans. Accordingly, it will be apparent that a mobile computer may experience extended and sometimes involuntary disconnection from many or all of the other devices with which it wants to share data.

In practice, mobile users may want to share their appointment calendars, bibliographic databases, meeting notes, evolving design documents, news bulletin boards, and other types of data in spite of their intermittent network connectivity. Thus, there is a need for systems that enable mobile clients to actively read and write shared data. Even though such a system most probably will have to cope with both voluntary and involuntary communication outages, it should behave from the user's viewpoint, to the extent possible, like a centralized, highly-available database service.

SUMMARY OF THE INVENTION

To that end, in accordance with this invention, write operations for weakly consistent replicated database systems have application-specific embedded dependency queries and related descriptions of the results that are expected to be returned when the respective dependency queries are run against the database. The dependency queries are arbitrary queries that are provided by the application to satisfy the requirements of the application. Write operations that conflict with the current state of any given instance of such a database are detected by comparing (a) the results that are returned when the dependency queries for those writes are run against the given instance of the database with (b) the results that are expected to be returned.

BRIEF DESCRIPTION OF THE DRAWINGS

Additional features and advantages of this invention will become apparent when the following detailed description is read in conjunction with the attached drawings, in which:

FIG. 14 tracks the scenario shown in FIG. 13.

DETAILED DESCRIPTION OF THE ILLUSTRATED EMBODIMENT

While the invention is described in some detail hereinbelow with reference to a particular embodiment, it is to be understood that there is no intent to limit it to that embodiment. On the contrary, the intent is to cover all modifications, alternatives and equivalents falling within the spirit and scope of the invention as defined by the appended claims.

A. A Typical Environment

Figure 1:
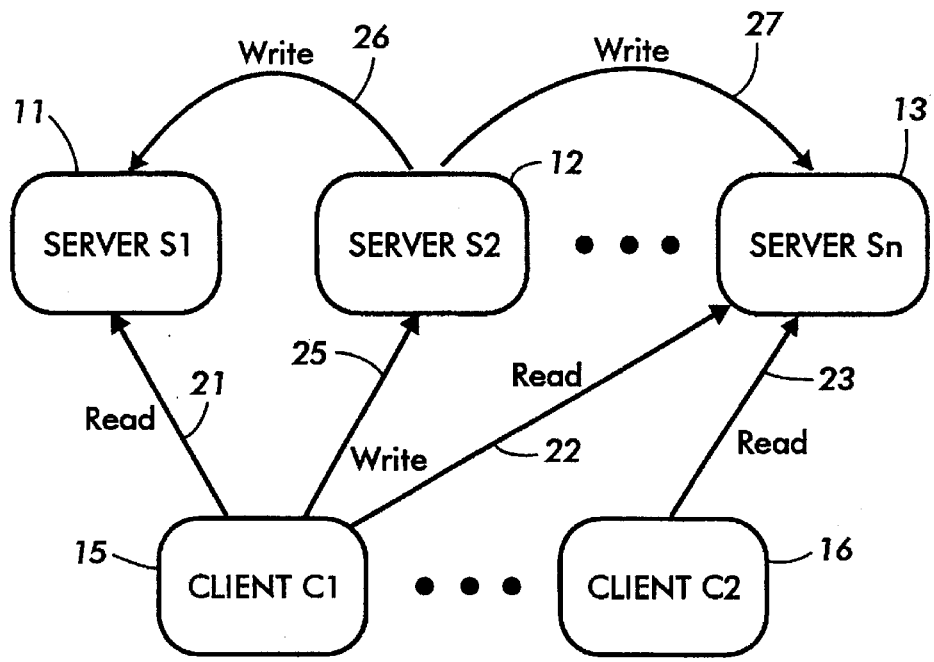
FIG. 1 is a simplified block diagram of a client/server architecture that may be used to carry out the present invention.

Some computational tools, such as PDAs (Personal Digital Assistants), have insufficient storage for holding copies of all, or perhaps any, of the data that their users want to access. For this reason, this invention conveniently is implemented by systems that are architected, as shown in FIG. 1, to divide functionality between servers, as at 11–13, which store data, and clients, as at 15 and 16, which read and write data that is managed by servers. A server is any machine that holds a complete copy of one or more databases. The term "database" is used loosely herein to denote a collection of data items, regardless of whether such data is managed as a relational database, is simply stored in a conventional file system, or conforms to any other data model. Clients are able to access data residing on any server to which they can communicate, and conversely, any machine holding a copy of a database, including personal laptops, are expected to be willing to service read and write requests from other clients.

Portable computers may be servers for some databases and clients for others. For instance, a client may be a server to satisfy the needs of several users who are disconnected from the rest of the system while actively collaborating, such as a group of colleagues taking a business trip together. Rather than merely giving a member of this disconnected working group access to only the data that he had the foresight to copy to his personal machine, the server/client model of FIG. 1 provides sufficient flexibility to let any group member have access to any data that is available in the group.

As will be appreciated, the notion of permitting servers to reside on portable machines is similar to the approach taken to support mobility in existing systems, such as Lotus Notes and Ficus.

Database replication is needed to enable non-connected users to access a common database. Unfortunately, many algorithms for managing replicated data, such as those based on maintaining strong data consistency by atomically updating all available copies, do not work well in a partitioned network such as is contemplated for the illustrated embodiment, particularly if site failures cannot be reliably detected. Quorum based schemes, which can accommodate some types of network partitions, do not work well for disconnected individuals or small groups. Moreover, algorithms based on pessimistic locking are also unattractive because they severely limit availability and perform poorly when message costs are high, as is generally the case in mobile environments.

Therefore, to maximize a client's ability to read and write data, even while completely disconnected from the rest of the computing environment, a read- any/write-any replication scheme, is preferred. This enables, a user to read from, as at 21–23, and write to, as at 25, any copy of the database. The timeliness with which writes will propagate to all other replicas of the database, as at 26 and 27, cannot be guaranteed because communication with certain of these replicas may be currently infeasible. Thus, the replicated databases are only weakly consistent. Techniques for managing weakly consistent replicated data, which have gained favor not only for their high availability but also for their scalability and simplicity, have been employed in a variety of prior systems.

Figure 2:
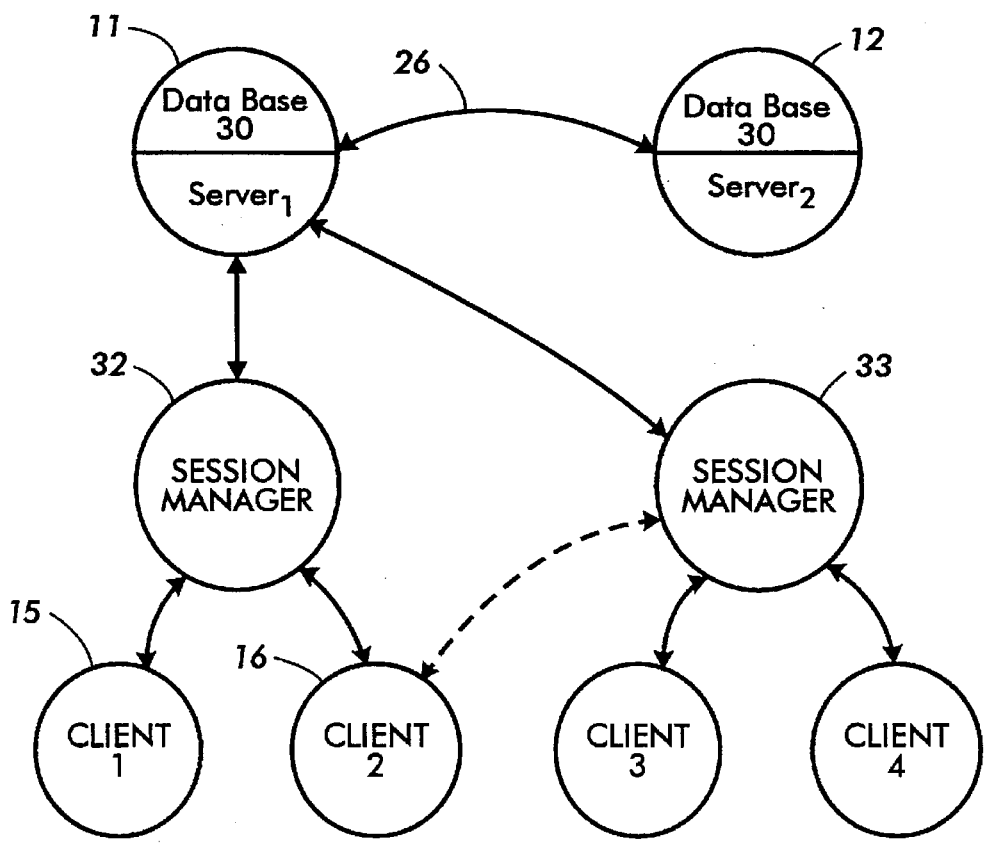
FIG. 2 shows how the architecture of FIG. 1 can be extended to include session managers for enforcing selected session guarantees on behalf of the clients.

As shown in some additional detail in FIG. 2, servers, such as 11 and 12, propagate writes, as at 26, among copies of a typical database 30 using an "anti-entropy" protocol. Anti-entropy ensures that all copies of a database 30 are converging towards the same state and will eventually converge to identical states if there are no new updates. To achieve this, the servers 11 and 12, as well as all other servers, must not only receive all writes but must also order them consistently.

Peer-to-peer anti-entropy is employed to ensure that any two servers that are able to communicate will be able to propagate updates between themselves. Under this approach, even machines that never directly communicate can exchange updates via intermediaries. Each server periodically selects another server with which to perform a pair-wise exchange of writes, as at 26; with the server selected depending on its availability as well as on the expected costs and benefits. At the end of this process, both servers 11 and 12 have identical copies of the database 30,—viz., at the end of the process, the servers 11 and 12 have the same writes effectively performed in the same order. Anti-entropy can be structured as an incremental process so that even servers with very intermittent or asymmetrical connections can eventually bring their databases into a mutually consistent state.

B. Session Guarantees

As pointed out in a copending and commonly assigned Douglas B. Terry et al. United States patent application, which was filed Sep. 28, 1994 under Ser. No. 08/314,971 on "Method for Providing Session Consistency Guarantees" now U.S. Pat. No. 5,581,753, a potential disadvantage of using read-any/write-any replication is that inconsistencies can appear within different instances of a given database 30, even when only a single user or application is making data modifications. For example, a mobile client might issue a write at one server, such as the server 12, and later issue a read at a different server 11. The client would see inconsistent results, unless these two servers 11 and 12 had performed anti-entropy, with one another or through a common chain of intermediaries, sometime between the execution of those two operations.

To alleviate these problems, session guarantees are provided. A "session" is an abstraction for the sequence of read and write operations performed on a database, such as the database 30, by one or more participants in the session during the execution of an application. One or more of the following four guarantees can be requested of a session manager 32 or 33 on a per-session basis:

Read Your Writes—during the course of a session, read operations by the participants reflect all previous writes by the participants.

Monotonic Reads—successive reads by the participants reflect a non-decreasing set of writes throughout a session.

Writes Follow Reads—during a session, the writes by the participants are propagated after reads on which they depend.

Monotonic Writes—during a session, the writes by the participants are propagated after writes that logically precede them.

These guarantees can be invoked to give individual applications a view of the database 30 that is consistent with their own actions, even if these applications read and write from various, potentially inconsistent servers. Different applications have different consistency requirements and different tolerances for inconsistent data. For this reason, provision advantageously is made for enabling applications to choose just the session guarantees that they require. The main cost of requesting session guarantees is a potential reduction in availability because the set of servers that are sufficiently up-to-date to meet the guarantees may be smaller than all the available servers. Those who want more information on these session guarantees can consult the aforementioned earlier filed Terry et al. application or may refer to a paper of Douglas B. Terry et al., "Session Guarantees for Weakly Consistent Replicated Data," *Proceedings International Conference on Parallel and Distributed Information Systems (PDIS)*, Austin, Tex. Sept. 1994, pp. 140–149.

C. Application Specific Detection of Update Conflicts

Because several clients may make concurrent writes to different servers or may attempt to update some data based on reading an out-of-date copy, update conflicts are unavoidable in a read-any/write-any replication scheme. These conflicts have two basic forms: write-write conflicts which occur when a plurality of clients update the same data item (or sets of data items) in incompatible ways, and read-write conflicts which occur when one client updates some data that is based on reading the value of another data item that is being concurrently updated by a second client (or, potentially, when the read is directed at a data item that was previously updated on a different server than the one being read).

Version vectors or simple timestamps are popularly used to detect write-write conflicts. Read-write conflicts, on the other hand, can be detected by recording and later checking an application's read-set. However, all these techniques ignore the applications' semantics. For example, consider a calendar manager in which users interactively schedule meetings by selecting blocks of time. A conflict, as viewed by the application, does not occur merely because two users concurrently edit the file containing the calendar data. Rather, conflicts arise if two users schedule meetings at the same time involving the same attendees.

Accordingly, it is more useful to detect update conflicts in an application-specific manner. A write conflict occurs when the state of the database differs in an application-relevant way from the state that is expected by a write operation. Therefore, a write operation advantageously includes not only the data being written or updated (i.e., the update set), but also a dependency set. The dependency set is a collection of application-supplied queries and their expected results. A conflict is detected if the queries, when run at a server against its current copy of a database, do not return the expected results.

These actions, as well as the resolution of any conflict that happens to be detected and the application of any appropriate updates to the database copy on the server that is processing the write operation, are carried out atomically from the viewpoint of all other reads and writes the server performs on that particular database. For the purpose of this embodiment it is assumed the database to be relational.

In keeping with more or less standard practices, an update set is composed of a sequence of update records. An update record, in turn, (a) specifies an update operation (i.e., an insert, delete, or modify), (b) names the database relation to which the specified update operation is to be applied, and (c) includes a tuple set that should be applied to the named database relation according to the named operation. Execution of an insert operation causes the related tuple set to be added to the name relation. On the other hand, the delete and modify operations examine the tuples currently in the named relation of the database to delete or replace, respectively, any of those tuples that match on the primary key of any of the tuples in the specified tuple set.

A dependency set is a sequence of zero or more dependency records; each of which contains a query to run against the database, together with a tuple set that specifies the "expected" result of running that query against the database in the absence of a conflict. As previously pointed out, a conflict is detected if any of the queries, when run at a server against its current copy of the database, fail to return the expected result.

Figure 3:
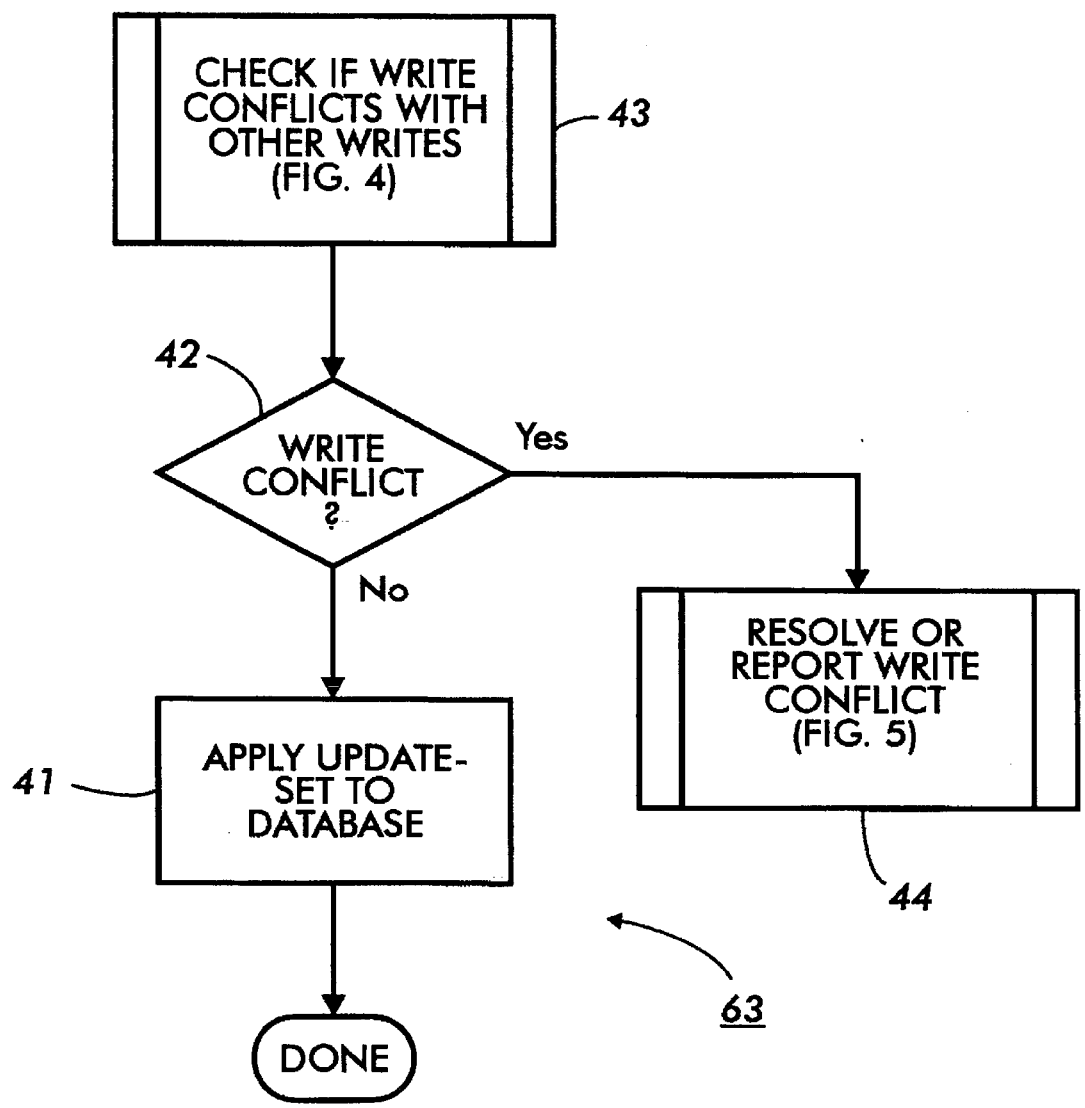
FIG. 3 is a flow diagram for a write execution process.

As shown in FIG. 3, a write operation is applied to a database, as at 41, only after it has been confirmed at 42 that no conflict has been detected by a conflict detection process 43. If a conflict is found to exist, its existence is reported or steps are taken to resolve it, as at 44.

Figure 4:
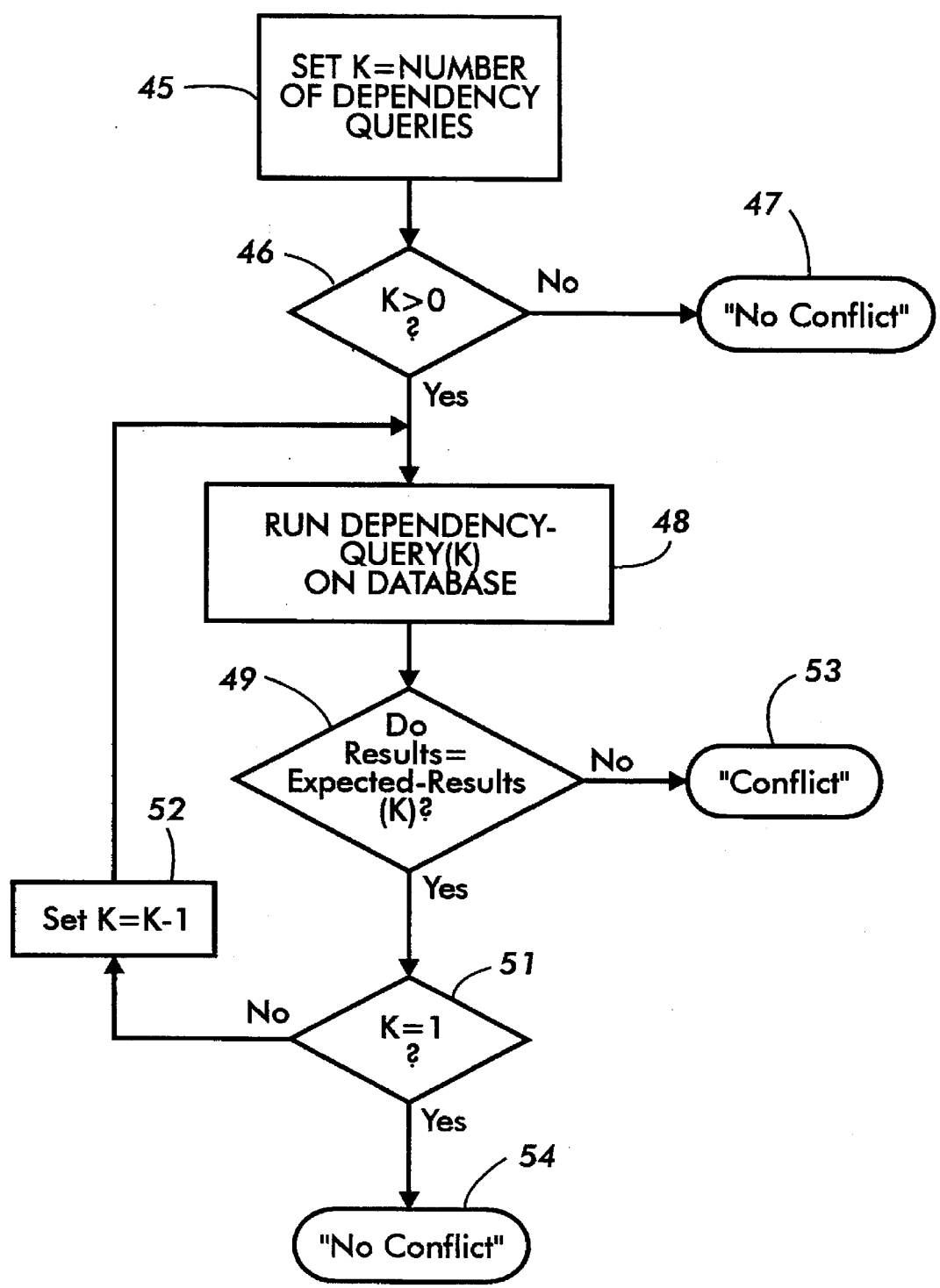
FIG. 4 is a flow diagram for an application specific conflict detection process.

Referring to FIG. 4, the application-specific conflict detection process 43 runs one after another all dependency queries for a particular write operation against the current version of the database at the server executing the write. To this end, an index K is initialized at 45 to a value that is equal to the number of dependency queries that are specified by the dependency set for the given write operation. If K initializes to a "0" value, it is concluded at 46 that there are no dependency checks and, therefore, a "no conflict" finding is forthcoming, as at 47. If, however, it is determined at 46 that there are one or more dependency checks embedded in the given write operation, the query for the first of these checks is run against the database, as at 48, and the results it returns are compared against the expected results of running that particular query, as at 49. If the actual and expected results match, the dependency check is satisfied, so the index K is re-evaluated at 51 to determine whether there are any additional dependency checks to be performed. If so, the index K is decremented at 52, and the next dependency check is performed at 48 and 49.

If it is found at 49 that the actual results returned by the database in response to any of the dependency queries fail to match the expected results, the conflict detection process 43 is brought to a conclusion at 53 in a "conflict" state. On the other hand, if all of the dependency checks for a given write operation are satisfied, the conflict detection process is brought to a conclusion at 54 in a "no conflict" state.

As will be evident, dependency sets can provide traditional optimistic concurrency control by having the dependency queries check the version stamps of any data that was read and on which the proposed update depends. However, the dependency checking mechanism is more general. For example, dependency checking permits "blind" writes where a client does not have access to any copy of the database yet wishes to inject a database update assuming that some condition holds. For instance, a client may wish to use a laptop computer to schedule a meeting in a particular room, assuming that the room is free at the desired time, even though the client does not currently have access to a copy of the room's calendar. In this case the write operation that tries to update the meeting room calendar to reserve the room, would include a dependency query that would be run prior to the execution of the write operation by a server to determine if the room is free during the time slot specified for the meeting.

D. Application Specific Resolution of Update Conflicts

Advantageously, the system not only detects update conflicts, but also resolves any detected conflicts. One approach to conflict resolution that is often taken in database systems with optimistic concurrency control is to simply abort each conflicting transaction. Other systems rely on humans for resolving conflicts as they are detected. Human resolution, however, is disadvantaged in a mobile computing environment because a user may submit an update to some server and then disconnect while the write is propagating in the background via anti-entropy. Consequently, at the time a write conflict is detected (i.e. when a dependency check fails) the user may be inaccessible.

Figure 5:
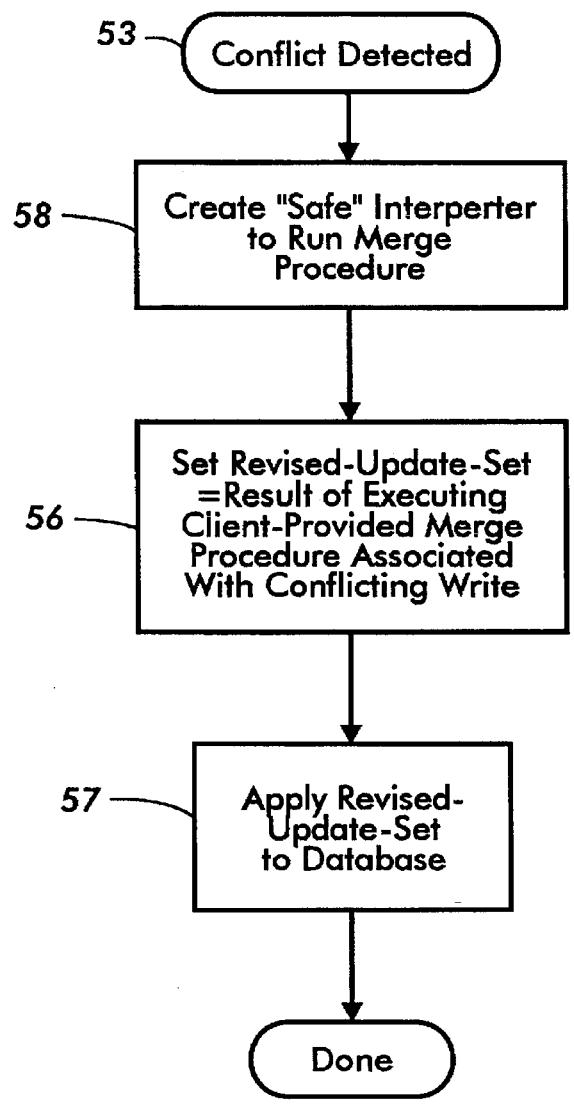
FIG. 5 is a flow diagram for an application specific conflict resolution process.

In the illustrated embodiment, provision is made to allow writes to specify how to resolve conflicts automatically based on the premise that there are a significant number of applications for which the order of concurrently issued write operations is either not a problem or can be suitably dealt with in an application-specific manner at each server maintaining a copy of a database. To carry out this conflict resolution process, as shown in FIG. 5, each write operation includes an application-specific procedure, called a "mergeproc" (merge procedure), that is invoked, as shown in FIG. 5, when a write conflict is detected, as at 53 (see FIG.

4). This procedure reads the database copy residing at the executing server and resolves the conflict by producing, as at 56, an alternate set of updates that are appropriate for the current database contents, as at 57.

The revised update set produced by the execution of a mergeproc may consist of a new set of tuples to be applied to the database, a null set of tuples (i.e., nothing should be applied), a set of one or more tuples to be applied to a special error log relation in the database, or a combination of the above.

Mergeprocs resemble mobile agents in that they originate at clients, are passed to servers, and are executed in a protected environment, as at 58, so that they cannot adversely impact the server's operation. However, unlike more general agents, they can only read and write a server's database. A mergeproc's execution must be a deterministic function of the database contents and mergeproc's static data.

Typically, to provide a "protected environment" for executing these mergeprocs, each of the mergeprocs is a function that is written in a suitable language, such as Tcl, to run in a new created interpreter in the address space of the server executing the mergeproc. The interpreter exits after it has run the mergeproc.

Mergeproc functions take no input parameters, but they produce a new update set as their output. More particularly, mergeprocs can invoke and receive the results of read-only database queries against the current state of the database. Other than this, however, they cannot obtain information about their surroundings and cannot affect their surroundings (other than by returning the update set they produce). In particular, they cannot inquire about non-deterministic variables, such as the current time or the states of various other resources of the server or the host it runs on because such inquiries could produce non-deterministic results. Suitably, these restrictions are enforced by modifying the Tcl interpreter that is used to disallow prohibited operations. Such "safe" interpreters are well-known to practitioners of the art.

It is noted that automatic resolution of concurrent updates to file directories has been proposed for some time and is now being employed in systems like Ficus and Coda. These systems have recently added support for application-specific resolution procedures, similar to mergeprocs, that are registered with servers and are invoked automatically when conflicts arise. However, in these existing systems the appropriate resolution procedure to invoke is chosen based on file properties such as the type of the file being updated. Mergeprocs are more flexible because they may be customized for each write operation based on the semantics of the application and on the intended effect of the specific write. For example, in the aforementioned calendar application, a mergeproc may include a list of alternate meeting times to be tried if the first choice is already taken.

In summary, in the instant system a write operation consists of a proposed update, a dependency set, and a mergeproc. The dependency set and mergeproc are both dictated by an application's semantics and may vary for each write operation issued by the application. The verification of the dependency check, the execution of the mergeproc, and the application of the update set is done atomically with respect to other database accesses on the server.

E. Stabilizing Writes

The weak consistency of the replicated databases that this system envisions means that a write operation may produce the desired update at one server but be detected as a conflict at another server, thereby producing a completely different update as the result of executing its mergeproc. Also, a write's mergeproc may produce different results at different servers because the execution of the mergeproc may depend on the current database state. Specifically, varying results can be produced if the servers have seen different sets of previous writes or if they process writes in different orders.

To achieve eventual consistency, servers must not only receive all writes, but must also agree on the order in which they apply these writes to their databases. As will be seen, some writes obtained via anti-entropy may need to be ordered before other writes that were previously obtained, and may therefore cause previous writes to be undone and reapplied to the server's database copy. Notice that, reapplying a write may cause it to update the database in a way that differs from the update produced by its previous execution.

A write is deemed to be "stabilized" when its effects on the database are permanent, that is, when it will never be undone and re-executed in the future. One way to detect stability of a given write is to gather enough information about each server to determine that no other writes exist that no other write will be accepted in the future that might be ordered prior to the given write. Unfortunately, the rate at which writes stabilize in this fashion would depend on the rate at which anti-entropy propagates information among all servers. For example, a server that is disconnected for extended periods of time could significantly delay stabilization and might cause a large number of writes to be rolled back later.

Figure 6:
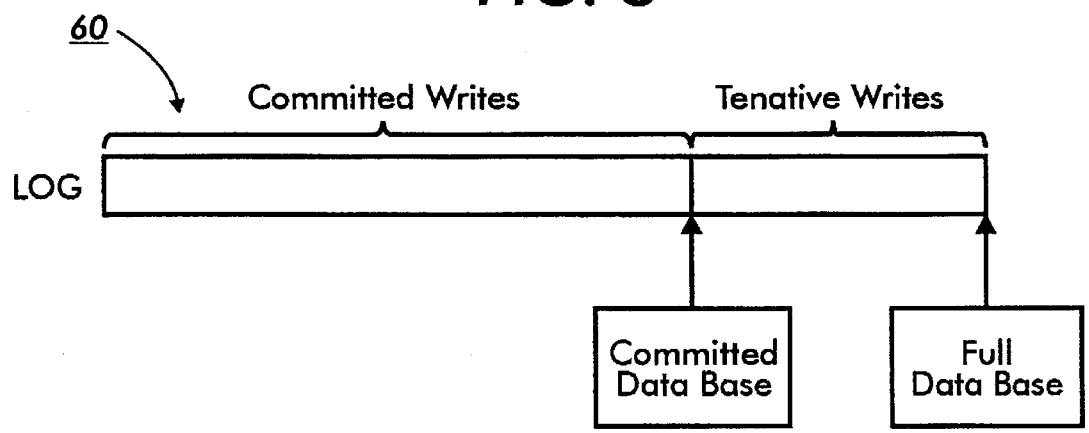
FIG. 6 is a schematic of a write log that discriminates between committed writes and tentative writes to identify a database so stable data ("committed database") and an extended database that includes potentially unstable data ("full database")

As indicated by the schematic of the write log 60 in FIG. 6, the illustrated embodiment includes the notion of explicitly "committing" a write. Once a write is committed, its order with respect to all other committed writes is fixed and no un-committed writes will be ordered before it, and thus its outcome will be stable. A write that has not yet been committed is called "tentative".

A client can inquire as to whether a given write is committed or tentative. The illustrated system allows clients to read tentative data, if they want to do so. However, those applications that are unprepared to deal with tentative data and its inherent instability may limit their requests to only return committed data. This choice is similar to the strict and loose read operations that have been implemented by others. Essentially, each server maintains two views of the database: a copy that only reflects committed data, and another "full" copy that also reflects the tentative writes currently known to the server. The full copy is an estimation of what the database will contain when the tentative writes reach the primary server.

One way to commit a write would be to run some sort of consensus protocol among a majority of servers. However, such protocols do not work well for the types of network partitions that occur among mobile computers.

Instead, in the instant system, each database has one distinguished server, the "primary", which is responsible for committing writes to that database. The other, "secondary" servers tentatively accept writes and propagate them toward the primary using anti-entropy. After secondary servers communicate with the primary, and propagate their tentative writes to it, the primary, converts these writes to committed writes, and a stable commit order is chosen for those writes by the primary server. Knowledge of committed writes and their ordering propagates from the primary back to the secondaries, again via anti-entropy. The existence of a primary server enables writes to commit even if other secondary servers remain disconnected. In many cases, the primary may be placed near the locus of update activity for a database, thereby allowing writes to commit as soon as possible.

Figure 7:
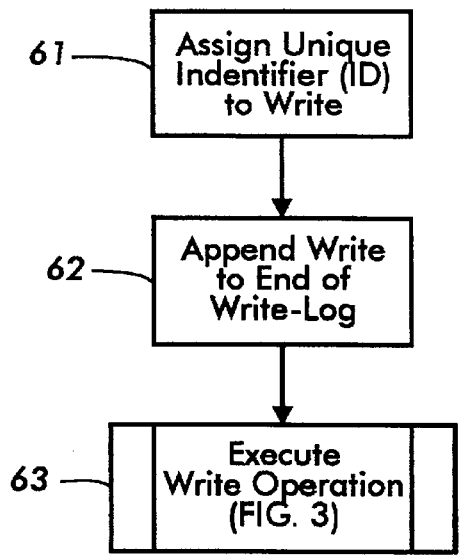
FIG. 7 is a flow diagram of a process for handling writes received from client applications.

More particularly, for stabilizing writes through the use of an explicit commit process of the foregoing type, write operations that a server accepts from a client application are handled differently than those that are received from another server. As shown in FIG. 7, writes received from a client are first assigned a unique ID, as at 61. Unique IDs are chosen by each server in such a way that a new write always gets ordered at the end of the server's write log. Thereafter, the write is appended, as at 62, to the tail or "young" end of the write log 60 (FIG. 6) within the server for the database to which the write is directed. Further, the write is executed, as at 63, to update the current state of the database.

Figure 8:
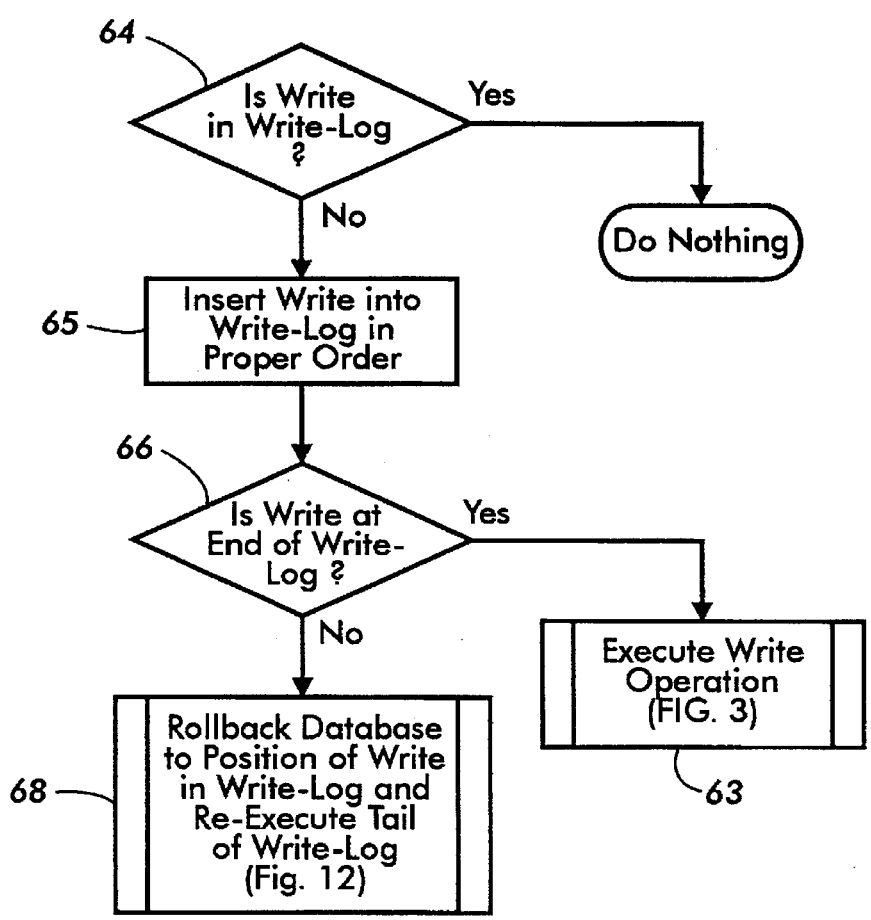
FIG. 8 is a flow diagram of a process for handling writes received from another server via anti-entropy.

On the other hand, as shown in FIG. 8, when a new write (i.e., a write not already in the write log 60 as determined at 64) is received from another server via anti-entropy, the write is not necessarily appended to the young end of the write log 60. Instead, a sort key is employed to insert the write into the write log in a sorted order, as at 65. A commit sequence number (CSN) is used as the sort key for ordering committed writes, while the write ID is used as the sort key for ordering tentative writes. These sort keys and the way they are assigned to the writes are described in more detail hereinbelow. At this point, however, it should be understood that both the tentative writes and the committed writes are consistently ordered within those two different classifications at all servers that have the writes or any subset of them. However, the reclassification of a write that occurs when a server learns that one of its tentative writes has been committed can cause that write to be reordered relative to one or more of the other tentative writes because a different sort key is used for the write once it is committed. As will be seen, steps preferably are taken to reduce the frequency and magnitude of the re-ordering that is required because of the computational cost of performing the re-ordering, but some re-ordering still should be anticipated.

Whenever a server inserts a write that was received from another server into its write log at 65, the server determines at 66 whether the write is being inserted at the young end of the log 60 or at some other position therein. If it is found that the write simply is being appended to the young end of the log, the write is executed at 63 to update the current state of the database (see FIG. 3). Conversely, if the write sorts into any other position in the write log 60, a rollback procedure is invoked, as at 68, for "rolling back" the database to a state corresponding to the position at which the new write is inserted in the write log 60 and for then sequentially re-executing, in sorted order, all writes that are located in the write log between the insert position for the new write and the young end of that 60.

Figure 9:
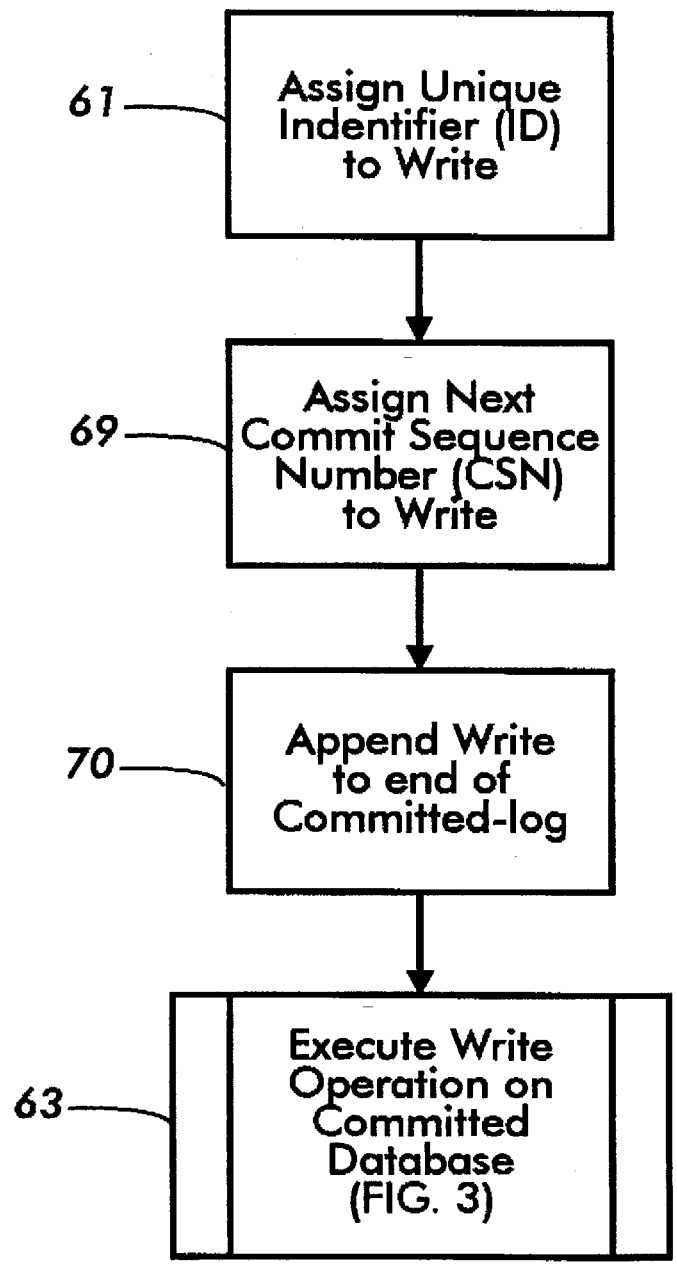
FIG. 9 is a flow diagram of a process for handling writes received from client applications by a primary server.

As previously mentioned, a write is stable only after it is committed. Moreover, once a write is committed, it never again has to be executed. Thus, a server need only have provision for identifying which writes have been committed, and need not fully store the write operation that it knows to be committed. Accordingly, some storage capacity savings may be realized. It was already pointed out that each database relies on just one server at a time (the "primary server") for committing writes to ensure that there is a consistent ordering of all the committed writes for any given database. This primary server commits each of these writes when it first receives it (i.e., whether the write is received from a client application or another server), and the committed state of the write then is propagated to all other servers by anti-entropy. FIG. 9 adequately illustrates the behavior of a primary server when it receives a write from a client. Each write that the primary server receives from a client is assigned a unique write ID, as at 61, plus the next available CSN in standard counting order, as at 669. Thereafter, the write is appended to the tail of the write - log (the log contains only committed writes), as at 70, and the write is executed, as at 63.

Figure 10:
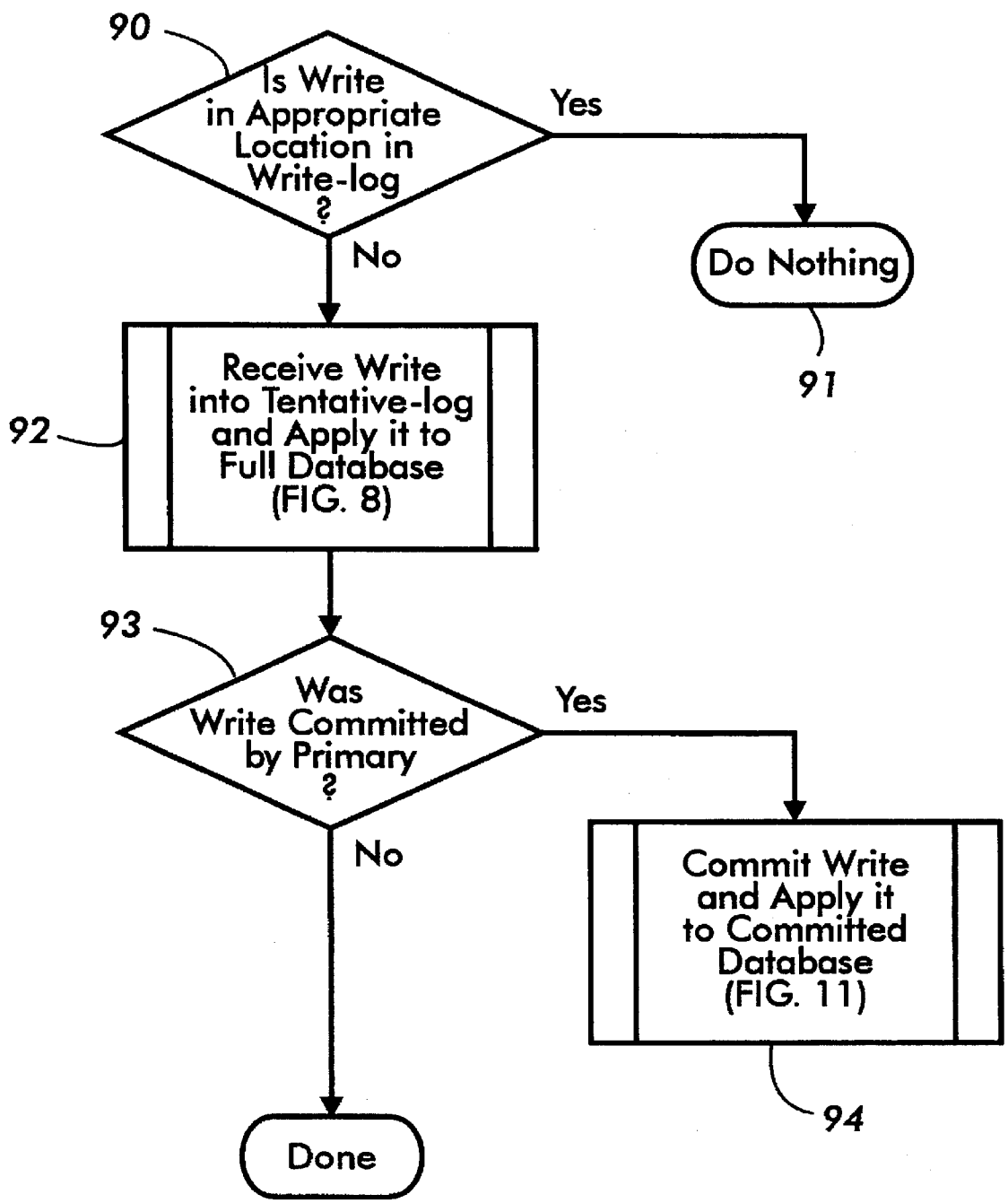
FIG. 10 expands on FIG. 8 to illustrate a process for handling writes received at a secondary server via anti-entropy from other servers.

As shown in FIG. 10, writes a secondary server receives from other servers via anti-entropy are examined at 90 to determine whether they are in the appropriate location in the write log 60 for that server. If so, the write is ignored, as at 91. Otherwise, however, the write is further processed at 92 in accordance with FIG. 8 to determine whether it is a new write and, if so, to insert it into the appropriate tentative location in the server's write log 60 and to apply it to the full database. Moreover, the write also is examined at 93 to determine whether it has been committed by the primary server. If it is found at 93 that the write has an apparently valid CSN, a process is invoked at 94 for committing the write at the secondary server and for re-executing it and all tentative writes if the committing of the write causes it to be re-ordered.

Figure 11:
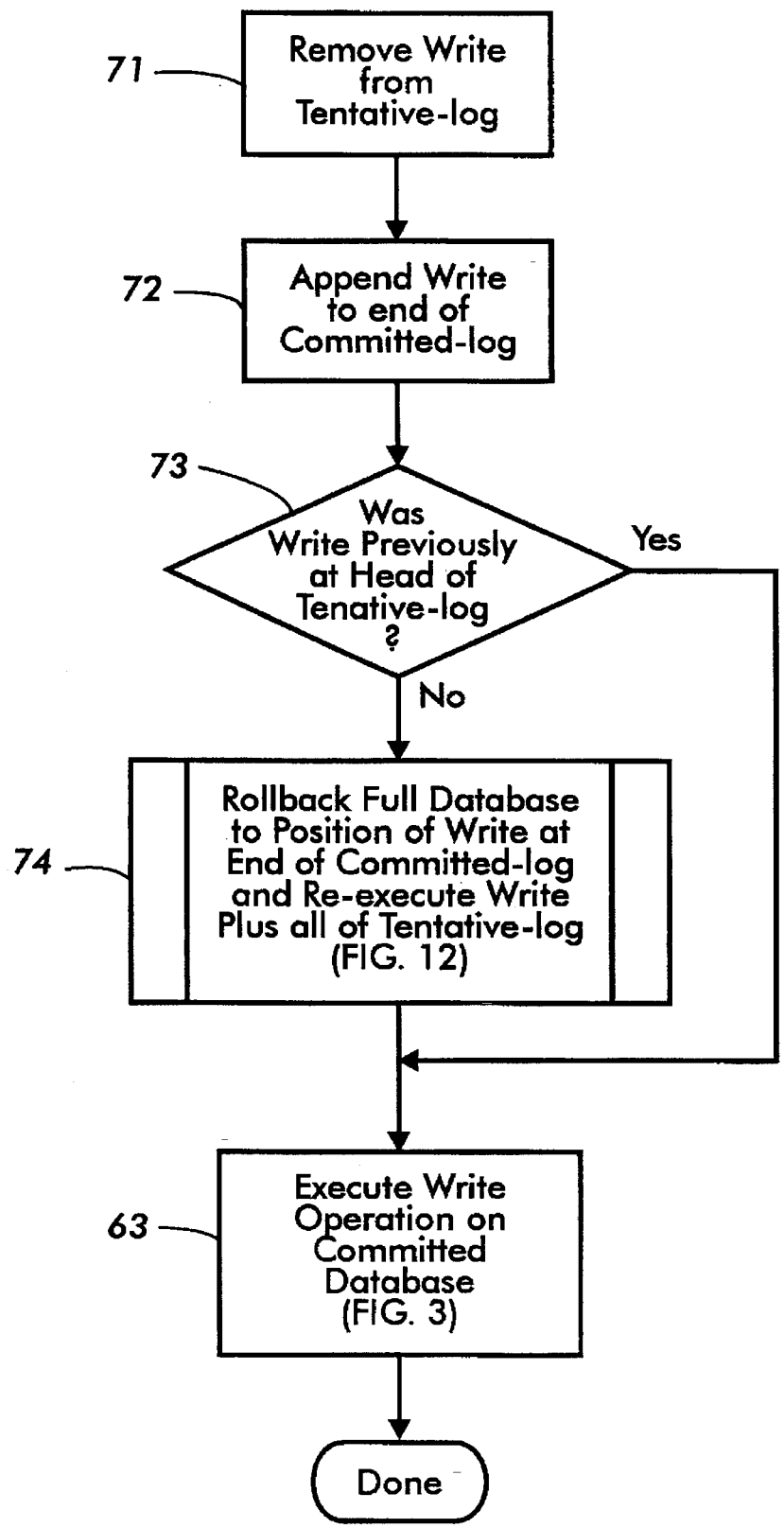
FIG. 11 expands on FIG. 10 to illustrate a process for committing writes at secondary servers.

Referring to FIG. 11, while committing a write received from another server, a secondary server removes any prior record that it has of the write from its tentative writes, as at 71, and appends the write to the young end of the committed write portion of its write log, as at 72. If it is determined at 73 that the ordering of the write in the write log 60 is unaffected by this reclassification process, no further action is required. If, however, the reclassification alters the ordering of the write, the database is rolled back as at 74 to a state corresponding to the new position of the write in the write log 60, and all writes between that position and the young end of the tentative portion of the write log 60 are re-executed as at 63.

Figure 12:
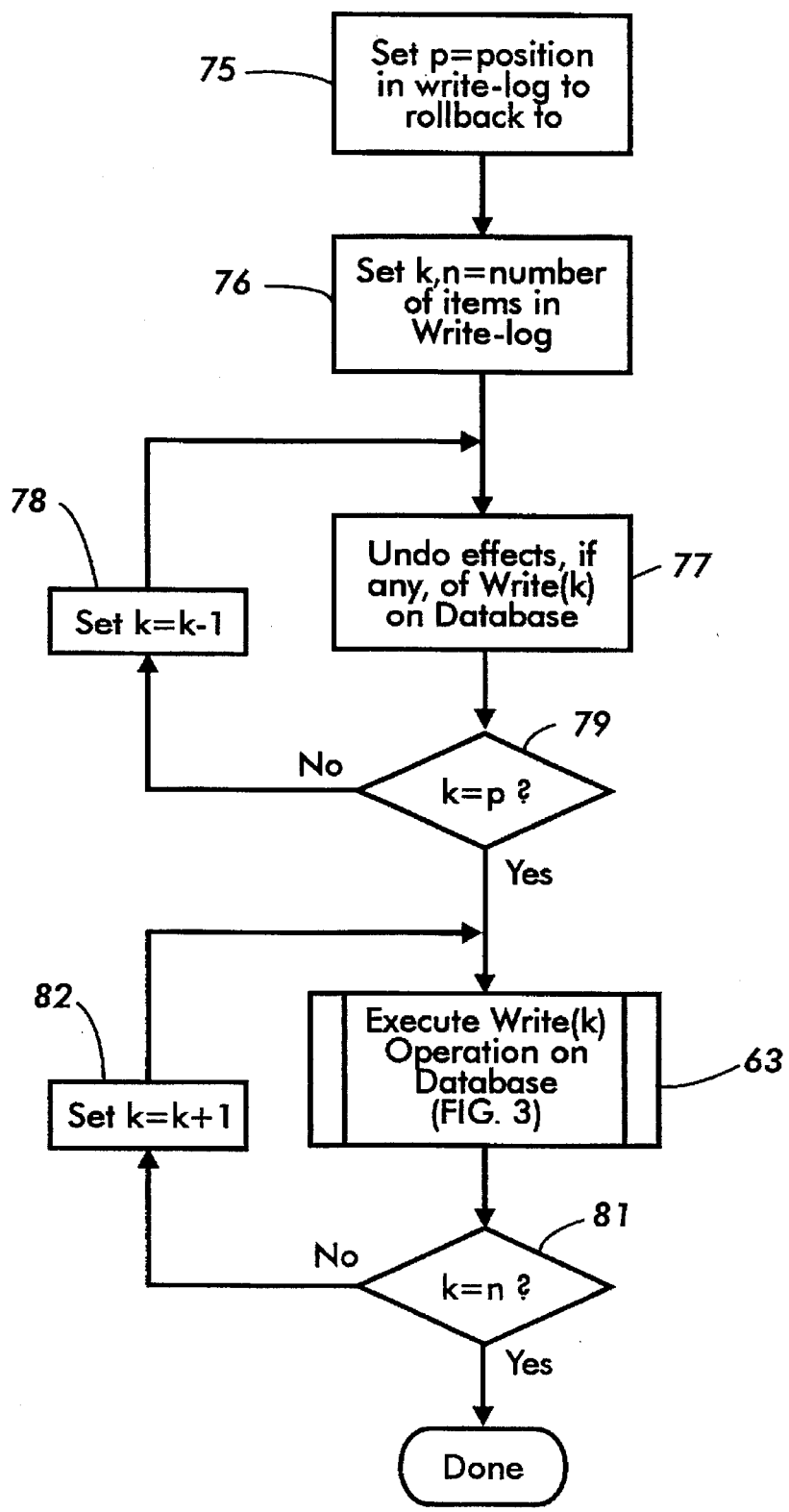
FIG. 12 illustrates a database roll/back process.

Database "roll back" and "roll forward" procedures are well known tools to database system architects. Nevertheless, in the interest of completeness, a suitable roll back procedure is shown in FIG. 12. As shown, the procedure is initialized (1) by setting a position index, p, to the positional location in the write log of the write record to which it is desired to roll back, as at 75, and (2) by setting a pointer k and a threshold count n to the total number of write records in the write log, as at 76. An iterative undo process is then run on the database, as at 77, to undo the effects on the database of one after another of the most recent writes while decrementing the pointer index k at 78 after the effect of each of those writes is undone and checking to determine at 79 whether there are any additional writes that still need to be undone. (The undo of a write that has not been applied to the database does nothing and writes can be undone in an order different than they were applied to the database.) This process 77–79 continues until it is determined at 79 that the pointer index k is pointing to the same position in the write log as the position index p. When that occurs, the write at which the pointer k is then pointing is executed as at 63 (FIG. 3). If it is determined at 81 that the pointer k is pointing at any write record, other than one at the young end of the write log 60, the pointer k is incremented at 82 to cause the next write in order toward the young end of the log to be re-executed at 63. Further iterations of this write re-execution procedure 80–82 the next following write instructions are carried out, until it is determined at 81 that the pointer k is pointing at the young end of the write log 60 (FIG. 6).

Figure 13:
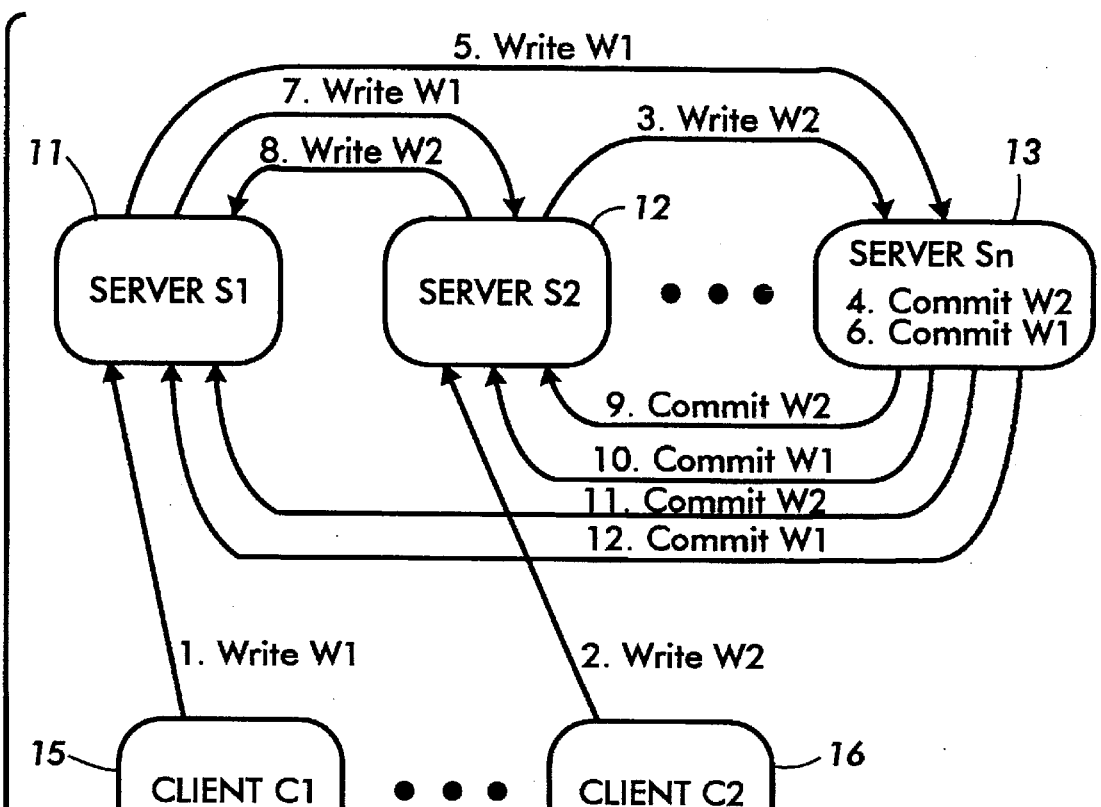
FIG. 13 illustrates a scenario of the type that cause write re-ordering.

FIG. 13 illustrates a scenario of the type that causes write re-ordering, and FIG. 14 tracks the scenario of FIG. 13 to show when the servers receive the writes and the current logs containing writes (1) in a tentative state (italicized characters) and (2) in a committed state (boldface characters). To simplify the presentation, the scenario assumes that each of the servers S1-Sn initially holds a single committed write, W0. Server Sn has been designated as being the primary server, so it is solely responsible for committing the writes W1 and W2.

As will be recalled, committed writes are ordered in accordance with their commit sequence numbers (CSNs). Tentative writes, on the other hand, are ordered; first by timestamps that indicate when they were initially received and secondly by the IDs of the servers by which they were initially received. Both the timestamps and server IDs are included in ID. Server IDs are used as a secondary sort key for disambiguating the ordering of tentative writes that have identical timestamp values.

F. Reading of Tentative Data by Clients and Disconnected Groups

Clients that issue writes generally want to see these updates reflected in their subsequent read requests to the database. Further, some of these clients may even issue writes that depend on reading their previous writes. This is likely to be true, even if the client is disconnected from the primary server such that the updates cannot be immediately committed. At any rate, to the extent possible, clients should be unaware that their updates are tentative and should see no change when the updates later commit; that is, the tentative results should equal the committed results whenever possible.

When two secondary servers exchange tentative writes using anti-entropy, they agree on a "tentative" ordering for these writes. As will be recalled, order is based in the first instance on timestamps assigned to each write by the server that first accepted it so that any two servers with identical sets of writes with different timestamps will order them identically. Thus, a group of servers that are disconnected from the primary will reach agreement among themselves on how to order writes and resolve internal conflicts. This write ordering is only tentative in that it may differ from the order that the primary server uses to commit the writes. However, in the case where no clients outside the disconnected group perform conflicting updates, the writes can and will eventually be committed by the primary server in the tentative order and produce the same effect on the committed database as they had on the tentative one.

CONCLUSIONS

As will be appreciated, the architecture that has been provided supports shared databases that can be read and updated by users who may be disconnected from other users, either individually or as a group. Certain of the features of this architecture can be used in other systems that may have similar or different requirements. For example, the application specific conflict detection that is described herein might be used in systems that rely upon manual resolution of the detected conflicts. Similarly, the application specific conflict resolution methodology might be employed in systems that utilize version vectors for conflict detection.

Briefly, the steps in processing a write operation can be summarized in somewhat simplified terms as follows:

0. Receive write operation from user or from another server.
1. If from user, then assign unique identifier (ID) to write of form <server ID, timestamp> and assign commit sequence number (CSN)=INFINITY. A CSN value of infinity indicates that the write is tentative.
2. If primary server, then assign commit sequence number=last assigned CSN+1.
3. Insert write into server's write log such that all writes in the log are ordered first by CSN, then by timestamp, and finally be server ID.
4. If write was previously in log at time it is entered into commit portion of log, then delete the prior instance to produce new write log.
5. If write not at the end of the write log, then rollback the server's database to the point just before the new write.
6. For each write in the log from the new write to the tail of the log, do
6.1 Run the dependency query over the database and get the results.
6.2 If the results do not equal the expected results then go to step 6.5.
6.3 Perform the expected update on the database.
6.4 Skip the next steps and go back to step 6.
6.5 Execute the mergeproc and get the revised update.
6.6 Perform the revised update on the database.

To utilize just the application-specific detection of conflicting writes portion of the process as summarized above, Eliminate step 2 of the process as summarized above, and Replace steps 6.5 and 6.6 with a new step "6.5 Abort write operation and/or report conflict to user".

Or, to employ the application-specific resolution of detected write conflicts by itself or in some other process, Eliminate step 2, and Replace steps 6.1 and 6.2 with a new step "6.1 If conflict detected by comparing version vectors or some method then go to step 6.5.".

Lastly, to use just the notion of maintaining two classes of data, committed and tentative.

Eliminate steps 6.1 and 6.2, and

Eliminate steps 6.4, 6.5 and 6.6.

What is claimed:

1. An application-specific process for detecting write operations which conflict with whatever state a database is found to have whenever any of said write operations is presented for updating said database; said process comprising embedding at least one dependency query in each of said write operations, together with a corresponding description of any results which are expected to be produced when said query is run against said database, where said dependency query is an arbitrary query on the database that is provided by the application as required to satisfy requirements of the application;

running each of the embedded dependency queries for any given write operation against said database whenever said given write operation is presented for updating said database until a conflict is detected or all of said queries have been applied;

collecting all results produced when any given dependency query for said given write operation is run against said database;

comparing the results produced by running said given dependency query against said database with the expected results of so doing; and identifying a given write operation as being in conflict with the state of said database whenever the results produced by running any given one of the dependency queries for the given write fail to match the expected results.

* * * * *